United States Patent [19]

Fertl et al.

[11] E Re. 28,963

[45] Reissued Sept. 14, 1976

[54] DETERMINATION OF RESIDUAL OIL IN A FORMATION

[75] Inventors: Walter H. Fertl, Ponca City, Okla.; Edward B. Reynolds, Spring, Tex.

[73] Assignee: Continental Oil Company, Ponca City, Okla.

[22] Filed: Nov. 21, 1975

[21] Appl. No.: 634,020

Related U.S. Patent Documents

Reissue of:

[64] Patent No.: 3,878,890
Issued: Apr. 22, 1975
Appl. No.: 420,189
Filed: Nov. 28, 1973

[52] U.S. Cl. ..... 166/252; 73/152; 166/273; 166/274

[51] Int. Cl.[2] ..... E21B 49/00

[58] Field of Search ..... 166/252, 250, 273, 274, 166/305 R; 73/151, 152, 153; 250/253, 256, 259, 260

[56] References Cited

UNITED STATES PATENTS

| | | | |
|---|---|---|---|
| 2,916,916 | 12/1959 | Holsclaw | 166/252 UX |
| 3,014,529 | 12/1961 | Graham | 166/250 X |
| 3,170,513 | 2/1965 | Dew et al. | 166/274 |
| 3,249,157 | 5/1966 | Brigham et al. | 166/273 |
| 3,254,714 | 6/1966 | Gogarty et al. | 166/274 |
| 3,373,809 | 3/1968 | Cooke, Jr. | 166/274 X |
| 3,381,940 | 5/1968 | Walstrom | 166/250 X |
| 3,631,245 | 12/1971 | Jorden, Jr. et al. | 250/259 |
| 3,748,474 | 7/1973 | Murphy | 250/259 |
| 3,817,328 | 6/1974 | Neuman | 250/259 X |
| 3,825,752 | 7/1974 | Murphy et al. | 250/259 X |

*Primary Examiner*—Stephen J. Novosad
*Attorney, Agent, or Firm*—F. Lindsey Scott

[57] ABSTRACT

A method for determining the amount of residual oil remaining in an oil bearing formation after primary production which includes the sequential steps of:

a. logging the formation to obtain logging data measurements of the relative quantities of residual oil and formation water present in the formation;

b. injecting a sufficient amount of an oil miscible solution through the bore hole into the formation to displace substantially all of the residual oil in the formation surrounding the bore hole;

c. injecting a sufficient amount of water into the formation through the bore hole to displace substantially all of the oil miscible solution thereby rendering the formation being tested substantially 100 per cent water saturated; and d. logging the formation for a second time to obtain logging data measurements which, when compared with the logging data measurements of the initial log indicate the amount of residual oil present in the formation, *wherein said logging data measurements are obtained by employing a reservoir property logging apparatus selected from the group consisting of resistivity logging apparatus, sonic logging apparatus and density logging apparatus.*

7 Claims, No Drawings

DETERMINATION OF RESIDUAL OIL IN A FORMATION

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a method of logging subterranean reservoirs traversed by well bores, particularly hydrocarbon-containing reservoirs. In one aspect this invention relates to a method for determining the amount of residual oil in an oil bearing formation employing logging techniques. In yet another aspect, this invention relates to a method for determining the amount of residual oil present in subterranean reservoirs traversed by well bores wherein such residual oil saturation properties are detected by the use of a log-reservoir flood injection-log technique.

2. Brief Description of the Prior Art

The importance of determining residual oil in place by means of sub-surface logging techniques has been recognized for some time. At the present new oil fields are becoming more difficult to discover and more attention is being given to secondary and tertiary methods for oil recovery in oil fields. However, prior logging techniques have required the use of radio-active materials or substantial knowledge of the subterranean formation such as porosity, lateral penetration, make up of the formation, and the like, if one is to obtain reliable information from such logging techniques. Therefore, while numerous methods have been and are being used to determine the amounts of residual oil present in reservoir formations, all of the prior art methods, regardless as to whether they employ core analysis, well testing, well logging, and the like, have certain limitations. Pitfalls and the rather unsatisfactory accuracy of the results using these conventional techniques have created a serious problem for the oil industry. Because of the high costs in recovering such residual oil through secondary or tertiary means, it is desirable and of utmost importance that an accurate, dependable method be developed for determining the amount of residual oil remaining in such formations. Until the present invention, there was no satisfactory method for accurately and inexpensively determining the amount of residual oil.

OBJECTS OF THE INVENTION

An object of the present invention is to provide a method for determining the amount of residual oil in a subterranean oil bearing formation.

Another object of the invention is to provide a new and improved technique for indicating directly the residual oil concentration in a subterranean formation by the use of reservoir property logging techniques.

Still another object of the present invention is to provide an improved, accurate technique for determining the amount of residual oil in a subterranean formation which is not dependent upon reservoir properties such as porosity, composition of said formation, and the like.

Other objects, and advantages of the present invention will become apparent to those skilled in the art from a reading of the following detailed description.

SUMMARY OF THE INVENTION

According to the present invention we have now discovered an improved technique for determining the amount of residual oil in an oil bearing formation penetrated by a well-bore. More specifically, we have found an improved technique for determining residual oil in place by means of sub-surface logging techniques.

Specifically, the technique for determining the residual oil in an oil bearing formation which has been penetrated by the borehole of a well includes the sequential steps of:

a. logging the formation to obtain logging data measurements of the relative quantities of residual oil and formation waters present in the formation;

b. injecting a sufficient amount of an oil miscible solution through the borehole into the formation to displace substantially all of the residual oil in the formation surrounding the borehole;

c. injecting a sufficient amount of water into the formation through the borehole to displace substantially all of the oil miscible solution thereby rendering the formation being tested substantially 100 percent water saturated; and, d. logging the formation for a second time to obtain logging data measurements which, when compared with the logging data measurements of the initial log indicates the amount of residual oil present in formation, *wherein said logging data measurements are obtained by employing a reservoir property logging means selected from the group consisting of resistivity log means, sonic log means and density log means.*

In carrying out the logging measurements in the technique of this invention, any reservoir property determining log measurement means can be employed. Further, accurate and reliable measurements can readily be obtained without knowledge of the porosity of the reservoir formation, and in clean and or shaly reservoir rock, each of which can be either water wet or oil wet.

DETAILED DESCRIPTION OF THE INVENTION

As previously stated, the present invention relates to a unique method for determining the residual oil present in oil bearing formations which have been penetrated by the borehole of a well. Broadly speaking, the method employs a combination of log-injection-log techniques to determine the amount of residual oil present in a subterranean oil bearing formation. By employing the method of the present invention for logging a drill hole to determine the amount of residual oil present in an oil bearing formation, one readily overcomes all the objectionable features of the prior art processes that have been enumerated above.

In determining the amount of residual oil present in an oil bearing formation, we have found that an accurate determination can be obtained wherein the formation, containing both residual oil and formation water, is logged by reservoir property log means to obtain logging data information on the amount of fluids present in said formation. Once the logging data has been obtained the formation is treated by miscible flooding techniques to displace substantially all of the residual oil in the formation surrounding the borehole of the well. The amount of miscible solution employed in the reservoir flooding step can vary widely but is in an amount sufficient to remove substantially all of the residual oil from the formation in the area surrounding the borehole to a distance exceeding the radius of investigation of the logging means being employed to obtain the logging data. After the flooding operation has been completed a sufficient amount of water is injected into the formation through the borehole of the well to displace substantially all of the oil miscible solution, thus rendering the formation being investigated substantially 100 percent water saturated. A second log is then made of the formation to obtain logging data measurements, which, when compared with the logging data measurement of the initial log, indicates the amount of residual oil present in the formation.

[The logging means employed to obtain the logging measurements in both the initial and second log can be any suitable logging means which will determine reservoir properties. For example, logging] *Logging* means capable of producing a resistivity log, a sonic log, or a density log can readily be employed in carrying out the method of the present invention.

After the initial logging data has been obtained the residual oil in the area of investigation is flushed from the formation by any suitable flooding technique. For example, one can employ any suitable miscible flooding technique to remove substantially all of the residual oil from the reservoir rock around the bore hole in the area of investigation. The term miscible flooding technique is to be understood to include chemical flooding procedures and other well known procedures such as solvent displacement, micellar solution, microemulsion and the like.

When employing a chemical flood, an effective amount of an aqueous solution containing a surface active agent is injected into the formation being tested. The concentration of surface active agent in the aqueous solution can vary widely but will generally vary within the range of from about 0.5 to 60 weight percent. The particular concentration employed will also be dependent on the viscosity of the formation oil encountered. Such surface active agents and chemical flooding techniques are well known in the art. Illustrative of surface active agents which can be employed in chemical flooding processes are:

A. Nonionic

I. Products obtained by autocondensation of various fatty matter and their derivatives with ethylene oxide, propylene oxide, glycols, or glycerols:

a. a fatty acid plus ethylene oxide or glycerol, such as palmitic acid plus 5 moles ethylene oxide or glycerol monostearate;

b. an alcohol plus ethylene oxide, such as hydroabietyl alcohol plus 15 moles ethylene oxide;

II. Products obtained by condensation of phenolic compounds having lateral chains with ethylene or propylene oxide. Examples are disecbutyl phenol plus 10 moles ethylene oxide and octyl phenol plus 12 moles ethylene oxide.

B. Cationic

I. Neutralization product of primary, secondary, or tertiary amine with an acid such as trimethyl octyl ammonium chloride, lauryl dimethyl benzyl ammonium chloride and the like, commonly referred to as quaternary ammonium chlorides.

C. Anionic

I. Alkyl aryl sulfonates such as ammonium isopropyl benzene sulfonate;

II. Fatty alcohol sulfates such as sodium 2-methyl-7-ethyl-4 hendecyl sulfate;

III. Sulfated and sulfonated amides and amines such as sodium N-methyl-N-oleyl taurate;

IV. Sulfated and sulfonated esters and ethers such as dioctyl sodium sulfo succinate;

V. Alkyl sulfonates such as sodium dodecyl sulfonate.

D. Ampholytic

I. Molecules where the molecule as a whole forms a zwitterion such as cetylaminoacetic acid.

A reference book which describes many types of surfactants suitable as foaming agents is "Surface Active Agents and Detergents," volumes I and II, by Schwartz et al., Interscience Publishers.

Another method which can be employed for displacing the residual oil in the formation being investigated is known as miscible flooding and is set forth in U.S. Pat. No. 3,170,513, issued Feb. 23, 1965, and entitled "Method of Miscible Flooding." In this method, a suitable volume of low molecular weight hydrocarbons is employed as the displacement hydrocarbon in combination with water. Once the low molecular weight hydrocarbon and water have been injected into the formation, a gas, in combination with water, is injected into the formation to push the displacement hydrocarbon through the oil bearing formation, thereby displacing the residual oil in the formation under investigation. Injection of the displacement hydrocarbon together with water is done in such volumes that a sufficient amount is placed in the reservoir to permit a miscible displacement of the reservoir oil by the displacement hydrocarbon and miscible displacement thereof by the gas.

The total injected hydrocarbon necesssary to maintain miscible displacement within the reservoir should be an amount from about 3 to about 15 percent, preferably 5 percent, of the hydrocarbon-filled pore space of the reservoir, as readily determinable by means known in the art. The mixture of displacement hydrocarbon and water moves through the reservoir in the same areas without appreciable gravity separation due to the fact that the injection hydrocarbon moves through the interior of the channels between the particles to displace the hydrocarbons, and the water moves through the remainder of the channels and adjacent the connate water. Therefore, the injected hydrocarbon provides displacement efficiency, and the water provides volumetric efficiency. Movement of a fluid through porous media is related to the saturation or proportion of the fluid present due to the inherent effects of the relative permeabilities of the reservoir. The velocity of movement of water or a hydrocarbon is calculated at any given saturation from the relative permeability at that saturation, the fluid viscosity, and the saturation change from the previous condition to the saturation under consideration. In the mixture of displacement hydrocarbon and water injected, the proportion of water is such that the velocity of movement of water is in excess of the velocity of liquid petroleum gas by at least 5 percent, and preferably in the order of 30 to 50 percent, thereby allowing larger volumes of water to be utilized during the injection of the hydrocarbon volume required for efficient miscibility.

The miscible displacement technique is also disclosed and set forth in U.S. Pat. No. 3,249,157 issued May 3, 1966 and entitled "Recovery Process for Producing Petroleum." Fluids which can be used to miscibly displace oil from the reservoir under investigation are set forth to include, but are not limited to, gaseous and liquified butane and propane, liquified petroleum gas (L.P.G.), acetone, propyl alcohol, dioxane, carbon tetrachloride and ethane. Non-hydrocarbon fluids miscible with, or highly soluble in, the oil at relatively higher pressures can be used and include carbon dioxide, hydrogen sulfide, nitrous oxide, and sulfur dioxide.

Micellar solutions can also be employed in the flooding of the formation to displace the residual oil by a miscible-type mechanism. In employing this technique, a slug of micellar solution is injected into the reservoir, followed by a bank of thickened water to prevent premature break-through of the final drive water. Generally, a 3 to about 20 percent pore volume slug of the micellar solution is employed; and, the amount of thickened water is sufficient to insure that the micellar solution has been forced completely into the formation being tested. These micellar solutions are surfactant-stabilized dispersions of oil and water, and may contain small quantities of other additives. Generally, the micellar solution contains:

1. Water or a water solution of one or more inorganic solutes that remain soluble when the solution is contacted by the components of the reservoir formation;
2. At least one surface active material having the properties that normally characterize a surfactant and as defined previously; and
3. An amphiphilic coupling agent comprising a polar organic material having a low water solubility.

Suitable aqueous liquids include: water; water solutions of alkali metal hydroxides, such as sodium hydroxide, potassium hydroxide, and the like; water solutions of salts such as sodium carbonate, sodium chloride, sodium bisulfate, and mixtures thereof. The pH of the aqueous liquid is preferably adjusted to one that is compatible with both an active form of the surfactant and the materials that will be encountered during the passage of the liquid through the reservoir formation.

Suitable surfactants include: the soaps of fatty acids, such as oleic, linoleic, hydroxy stearic, etc.: the soaps of mixed organic acids, such as the tall oil fatty acids, tall oil pitch, rosin acids, the petroleum naphthenic acids, and the soybean oil fatty acids; the surface active organic sulfonates and sulfonic acid salts, the nonionic and cationic surface active materials, and the like, e.g., surface-active materials such as those described under the classification of detergent compounds in Industrial Detergency by William W. Niven, Jr., Reinhold Publishing Co., New York, 1955.

Suitable amphiphilic coupling agents include: the higher molecular weight, monohydroxy aliphatic and alicyclic alcohols, such as those containing six or more carbon atoms; the aromatic hydroxylic compounds such as the phenols, and cresols; the pine oils; the sterols; cholesterols; bile salts; fatty acids containing six or more carbon atoms; amines or esters of low water solubility.

In forming the present solubilizing solutions, the selection of the concentration at which the surfactant is dissolved in the aqueous liquid is preferably based on the critical concentration for micelle formation (abbreviated CMC) for such a system at the temperature of the reservoir formation. The surfactant concentration is preferably at least equal to the CMC proportions and may exceed them to the extent that is economically advantageous. In general, increasing the proportion of surfactant increases the oil solubilizing capacity, the viscosity and the cost of the solubilizing solution. The selection of the concentration at which the amphiphile is dissolved in the surfactant micelles is preferably based on the amount required to saturate the solution at the temperature of the reservoir formation. This can be determined by maintaining a portion of the aqueous liquid solution of the surfactant micelles at the temperature of the reservoir formation and adding portions of the amphiphile until the addition of an additional portion causes the solution to remain turbid. The amphiphile concentration is preferably one lying between the proportion of the amphiphile that is required to saturate the aqueous liquid and the proportion that is required to saturate the micelles.

The bank of thickened water is employed as a mobility buffer to assure stable movement of the slug of micellar solution. The thickening agent can be any suitable agent such as high molecular weight water-soluble polymers which are well known in the art, e.g. polyacrylamide, sulfonated polystyrene, and the like.

Yet another technique which can be employed to remove substantially all of the residual oil from the formation under investigation is known as the microemulsion oil recovery process in which microemulsion forming solutions are employed to drive the oil from the formation. Such a process is disclosed in U.S. Pat. No. 3,373,809, issued Mar. 19, 1968 and entitled "Microemulsion Oil Recovery Process" and U.S. Pat. No. 3,254,714, issued June 7, 1966 and entitled "Use of Microemulsions in Miscible-Type Oil Recovery Procedure," each of which are hereby incorporated by reference.

In this process, a small bank of an oil component, such as petroleum crude, "light end" kerosene, toluene, or other light aromatic oils, paraffinic oils, and the like, is injected into the formation under investigation. Thereafter, an aqueous slug containing suitable concentrations of polar organic compounds and surfactants is injected into the formation. The concentrations of the polar organic compounds in the aqueous slug can vary widely, as can the concentrations of the surfactants. Generally, the concentration of the polar organic compound or compounds will range from about 15 to 60 percent by weight, depending primarily upon the selection of the surfactant, and the relative ease with which the reservoir oil or injected oil forms microemulsions. The concentration of surfactant (s) will generally range from about 5 to 40 percent by weight, based on the total weight of the injected aqueous solution.

Suitable examples of polar organic compounds for use in accordance with the invention include the n-, cyclo- and iso-alcohols having 4–16 carbon atoms per molecule; the n-, cyclo- and iso-amines having 5–12 carbon atoms per molecule; phenol and phenols having side chains with 1–10 carbon atoms per molecule; n-, cyclo- and isomercaptans having 2–10 carbon atoms per molecule; glycols having 2–12 carbon atoms per molecule; fatty acids having 6–22 carbon atoms per molecule; glycerols having 3–18 carbon atoms per molecule; ketones having 5–18 carbon atoms per molecule; ethers having 4–18 carbon atoms per molecule; aldehydes having 4–18 carbon atoms per molecule; and mixtures of two or more of the above. All these molecules may contain saturated or unsaturated carbon-carbon bonds.

Suitable surfactants include anionic and nonionic compounds, for example, sulfonated aromatic hydrocarbons, ethylene oxide condensates of aliphatic acids, alkyl aryl polyalkylene glycol ethers, esters of sulfosuccinic acid, mono- and dibasic carboxylic acids, alkyl and aryl sulfates; specific examples of which include isopropyl naphthalene sodium sulfonate, sulfonated petroleum distillates, ethylene oxide condensates of coco fatty acids, octylphenyl polyoxyethylene ether, diisooctyl sodium sulfosuccinate, perfluorocaprylic acid, diisohexyl succinic acid, dodecyl sulfate and amylphenyl sulfate.

Specific combinations of a polar organic compound and a soap or detergent for use in the present invention include phenol and sodium oleate; phenol and sodium abietate; phenol and ethanolamine oleate, pine oil and sodium oleate; glycerol and turkey red oil; diethylene glycol and turkey red oil; octyl alcohol and potassium myristate; octylamine and potassium myristate; octyl mercaptan and potassium myristate; cetyl alcohol and oleic acid; p-methyl cyclohexanol and oleic acid; oleic acid and sodium oleate; n-amyl alcohol and an octylphenyl polyoxyethylene ether obtained by reacting 13 mols of ethylene oxide with octyl-phenol (Triton X-102).

Other suitable techniques can be employed to displace the residual oil in the formation. Such other methods include, but are not limited to, alcohol displacement techniques, overbased surfactant water flooding techniques, and any other suitable flooding techniques or oil displacement techniques which are well known in the art.

Once the residual oil has been removed from the formation under investigation by any suitable flooding treatment such as these described above, the formation is then saturated with water, either original formation water or brine water, so that the formation is substantially a 100 percent water bearing reservoir formation. A second log is run on the water saturated formation to obtain logging data measurements. These second measurements are then compared with the measurements obtained by the initial log and the difference represents the amount of residual oil present in the formation.

To better illustrate the invention the following Examples are set forth. However, it is to be understood that the examples are for illustrative purposes only and are not intended to limit the scope of the present invention:

EXAMPLE I

In order to determine the residual oil present in a formation which has been penetrated by the borehole of a well the sequential steps are as followed:

1. A resistivity log is made on the formation in question. The reservoir rock around the borehole contains, at this point in time formation water and an undetermined amount of residual oil. The resistivity log provides a measurement designated $R_1$ ($\Omega M$).
2. An aqueous solution containing a surface active agent (an overbased sulfonate derived from a petroleum refining steam, e.g. pale oil extract, as set forth in U.S. Pending Patent Application 322,922,) is injected into the formation through the borehole of the well. Sufficient solution is injected to insure that the residual oil has been displaced from the vicinity of the borehole to a distance exceeding the radius of investigation of the logging tool.
3. Brine water is then injected into the chemically cleaned formation to resaturate same and thus cause same to be substantially a 100 percent water-bearing reservoir rock.
4. A second resistivity log is made on the formation. This resistivity log provides a measurement designated as $R_0$ since the formation is 100 percent water saturated.

In other words, the residual oil saturation (ROS) can readily be determined using the following mathematical considerations:

$$(R_1)(1-ROS)^n = (Rw1)(F) \qquad \text{Eq. (1)}$$

where $R_1$ = log response No. 1 n = saturation exponent

Rw1 = formation water resistivity, both during log response No. 1 and No. 2.

F = formation factor (as related to porosity)

If ROS = O, e.g. water saturation ($S_W$) = 1.0, then $$R_0 = (Rw1)\,F. \qquad \text{Eq. (2)}$$

Therefore, combining Equation (1) and (2)

$$\frac{R_1}{Rw1}(1-ROS)^n = \frac{Ro}{Rw1}$$

$$ROS = 1 = (R_0/R_1)^{1/n} \qquad \text{Eq. (3)}$$

By employing deep investigating logging devices one can obtain measurements farther into the formation, thus providing a more representative value for ROS than has heretofor been possible. In addition, it should be noted that method does not require knowledge of reservoir porosity. Elimination of the porosity parameter and the fact that the three remaining parameters can all be determined with a comparatively high degree of accuracy renders the above described method a highly reliable one.

EXAMPLE II

In this example the same sequential steps set forth in Example I are employed with the exception that reservoir rock contains only residual oil (no formation water) and the logging tool employed is an acoustic logging tool which measures the travel time (sec/ft.) of sound through the formation over a fixed distance. The tool response can be expressed as follows:

$$\Delta t = 0^* \Delta t_{fl} + (1 - 0)^* \Delta t_{mu} \qquad (1)$$

or expressed in corresponding velocities $$\Delta t = \frac{1}{V_p} = \frac{1}{V_{fl}} + \frac{(1-\phi)}{V_{mu}} \qquad (2)$$

where $\Delta t$ = transit time from log reading $\Delta t_{fl}$ = transit time of pore fluid $\Delta t_{mu}$ = transit time in rock matrix 0 = porosity of reservoir rock $v_p$ = compressional velocity $v_{fl}$ = fluid velocity $v_{ma}$ = rock matrix velocity Since the residual oil has been removed from the formation being tested after the initial log was run and before the second log, the difference in the acoustic signal will be a direct function of the amount of residual oil. This is true due to the fact that brine and oil have different acoustic properties, such as compressional velocities as shown below.

| Liquid | $V_p$ (ft/sec) |
|---|---|
| Petroleum | 4200 |
| Water 200,000 ppm NaCl | 5500 |
| 100,000 ppm NaCl | 5200 |
| 0 ppm NaCl | 4800 |

Therefore, after the reservoir under test has been cleaned of the residual oil and the formation saturated with brine the difference in the sonic response in log 1 and log 2 is due to the amount of residual oil present in the formation. Such can be expressed as follows:

$$\Delta(\Delta t)_{log\ 1,2} = f(\Delta t_{fl})_{ROS,ROS=0} = f(ROS)$$

Since the formation contains only residual oil it sometimes is advantageous to preflush the formation with high salinity brine to enhance the sonic response between oil and the brine. When such preflushing step is employed the water injected subsequently to produce the water saturated formation is the same as that employed in the preflushing step.

EXAMPLE III

In this example, density logs are employed to determine the amount of residual oil present in a formation which has been penetrated by the borehole of a well. The method involves the following sequential steps:

1. a density log is made on the formation in question. The reservoir rock around the borehole contains formation water and an undetermined amount of residual oil.
2. After the density log has been obtained the formation under investigation is cleaned of the residual oil by the use of micellar solutions. Sufficient solution must be injected into the formation to insure that the residual oil has been displaced from the vicinity of the borehole to a distance exceeding the radius of investigation of the logging tool.
3. Water, either original formation water, or injection water, is then injected into the cleaned reservoir rock so that same is substantially 100 percent water saturated.
4. A second density log is made on the formation. This log measures the bulk density of the water-saturated rock in the formation.

The oil saturation (So) remaining in the reservoir rock after primary recovery can thus be determined using the following mathematical considerations:

General density log response:

$$\phi_b = 0\phi_{fl} + (1 - 0)\ \phi_{ma}$$

where $\phi_b$ = bulk density measure by log $\phi$fl = density of fluid in pore space of reservoir rock.

$\phi$ma = matrix density of reservoir rock

0 = porosity of reservoir rock

Based upon the data received from the formation using the above described log-inject-log technique, one can write the following:

Logging measurements from first density log (Step 1) are represented as follows:

$$\phi b_1 = 0\phi_{fl} + (1 - 0)\phi_{ma}$$

where

So ≥ ROS

Logging measurements from second density log (Step 4) are represented as follows:

$$\phi b_1 = 0\phi_{fl_2} + (1 - 0)\phi_{ma}$$

where

So = 0

$$\phi b_2 - \phi b_1 = \Delta\phi_{2,1}$$

where $$\phi b_2 > \phi b_1$$

$$\phi fl_2 - \phi f_1 = \Delta\phi f_{2,1}$$

where $$\phi fl_2 > \phi fl_1$$

Combining the response of the first log and the second log.

$$\frac{\Delta\rho 2,1}{\phi} = \Delta\rho f_{2,1}$$

$$\Delta\phi f2,1 = f(So)$$

where

So ≥ ROS

Since the properties of the water injected into the formation (Step 3) and the produced hydrocarbon, in addition to reservoir conditions, pressure and temperature are known, the value $\Delta\phi f_{2,1}$ represents the amount of residual oil in the formation being tested.

From the above examples and detailed description of the preferred embodiments it can readily be seen that by employing the method of the present invention one can readily and accurately determine the amount of residual oil remaining in an oil bearing formation after primary production of said formation. In addition, it is evident that certain modifications can be made in practicing the method of the present invention without departing from the scope of same which is defined in the appended claims.

Having thus described the invention, we claim:

1. A method for determining the residual oil in an oil bearing formation penetrated by the bore hole of a well comprising the steps of:

a. logging said formation to obtain logging data measurements of the relative quantities of residual oil and formation water present in the formation;

b. injecting into said formation, through said borehole, a sufficient amount of an oil miscible solution, to displace substantially all of the residual oil in said formation surrounding said borehole to a distance exceeding the radius of investigation of the logging means providing the logging data;

c. injecting into said formation through said borehole a sufficient amount of water to displace substantially all of said oil miscible solution and cause said formation being tested to be substantially 100 percent water saturated; and d. logging for a second time said formation to obtain logging data measurements; and, e. comparing the logging data measurements of said second log with the logging data measurements of said first log to determine the amount of residual oil in said formation, *wherein said logging data measurements are obtained by employing a reservoir property logging means selected from the group con-*

*sisting of resistivity log means, sonic log means and density log means.*

[ 2. The method of claim 1 wherein said logging data measurements are obtained by employing a reservoir property logging means selected from the group consisting of resistivity log means, sonic log means and density log means. ]

3. The method of claim 1 wherein said oil miscible solution is an aqueous solution containing from about 0.5 to 60 weight percent of a surface active agent.

4. The method of claim 3 wherein said surface active agent is an overbased pale oil extract sulfonate.

5. The method of claim 1 wherein said oil miscible solution is a mixture of liquified low molecular weight hydrocarbon and water, said hydrocarbon being present in an amount of from about 3 to 15 percent of the reservoir hydrocarbon pore space and said water being in an amount such that the movement velocity of said water in said reservoir is greater than the movement velocity of said hydrocarbon in said reservoir.

6. The method of claim 1 wherein said oil miscible solution is a micellar solution and from about 3 to 20 percent pore volume of said micellar solution is injected into said formation.

7. The method of claim 1 wherein said oil miscible solution is microemulsion forming solution and said microemulsion forming solution is an aqueous solution containing from about 15 to 60 weight percent of a polar organic compound and from about 5 to 40 percent by weight, based on the total weight of said aqueous solution, of a surface active agent.

8. The method of claim 7 which includes the step of injecting a minor amount of an oil component miscible with the reservoir oil into said formation prior to injection of said microemulsion forming solution.

* * * * *